UNITED STATES PATENT OFFICE.

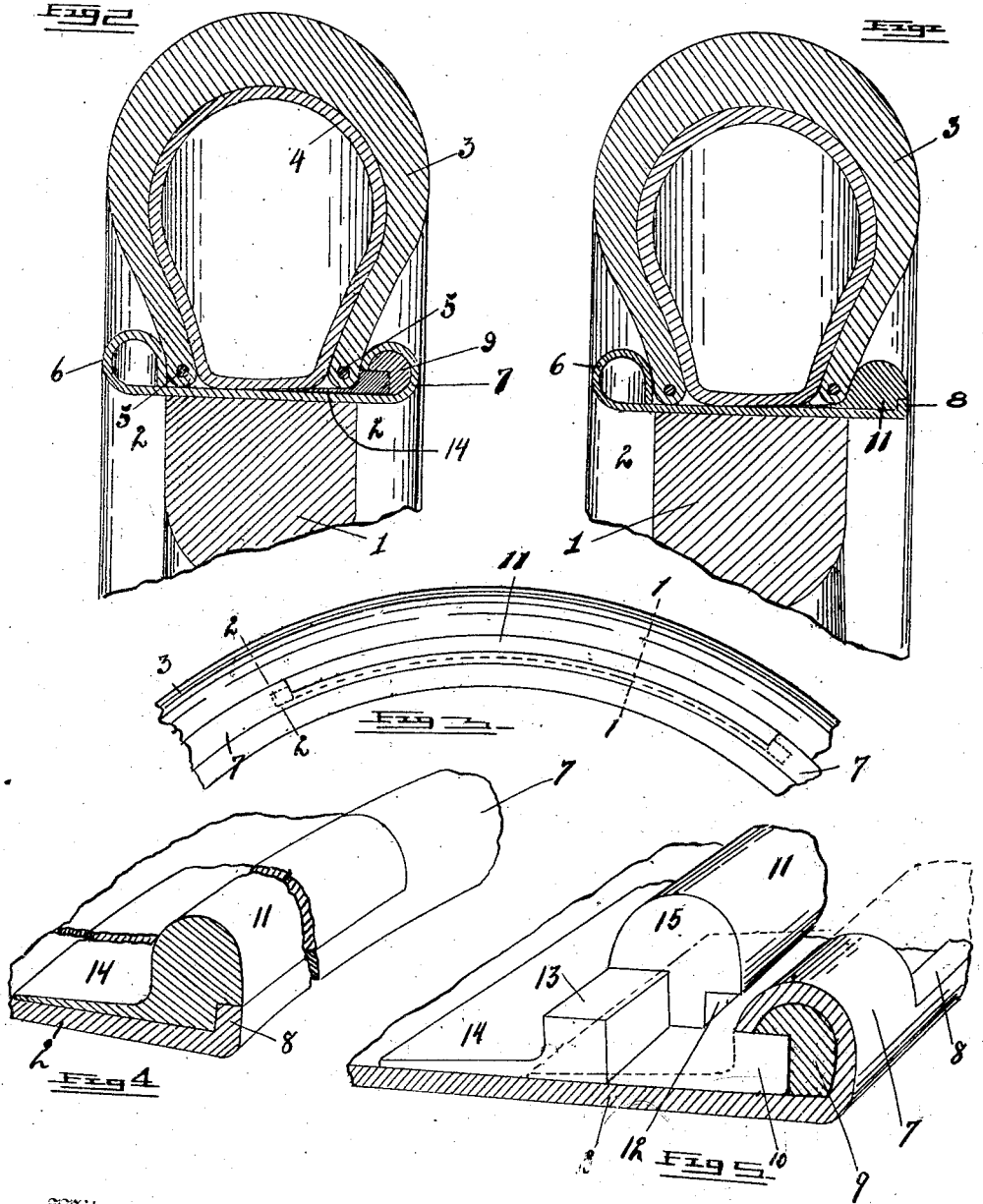

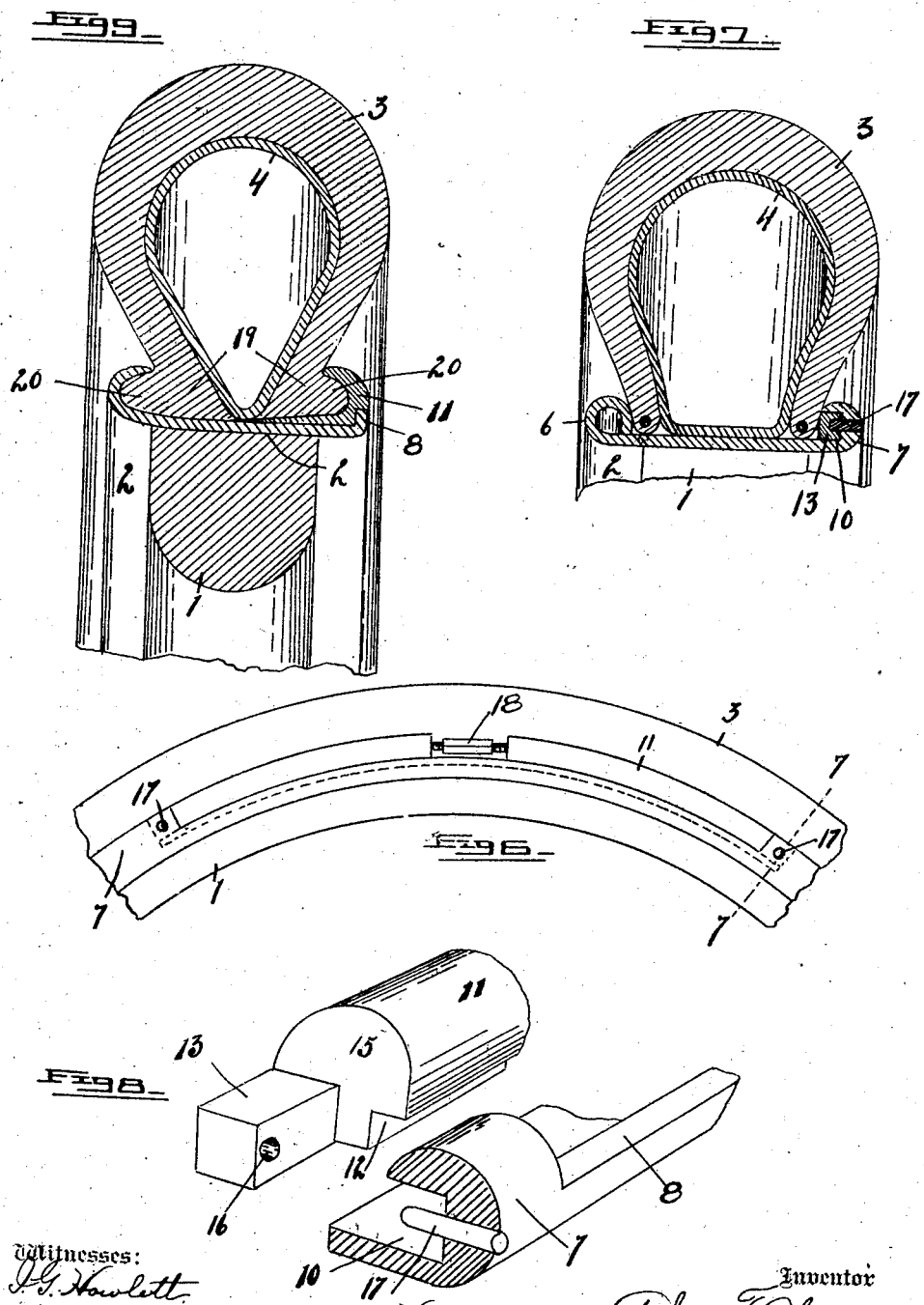

ANDREW T. SHERMAN, OF DETROIT, MICHIGAN.

VEHICLE-WHEEL TIRE.

No. 832,702.　　　　Specification of Letters Patent.　　　　Patented Oct. 9, 1906.

Application filed January 18, 1904. Serial No. 189,405.

*To all whom it may concern:*

Be it known that I, ANDREW T. SHERMAN, a citizen of the United States, residing at Detroit, in the county of Wayne, State of Michigan, have invented certain new and useful Improvements in Vehicle-Wheel Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to pneumatic or inflatable tires for vehicle-wheels, and more particularly to that class wherein the metal rim or tire-seat is made to detachably retain the tire proper, comprising an outer casing and an inner inflatable tube.

The object of this invention is to produce a tire of the character described wherein provision is made for readily removing from the metal rim the outer casing or at least one margin of said casing, so as to afford access to the inner tube to facilitate repair in case of a puncture or other injury thereto, the arrangement being such as to enable the margin of the outer casing, which in tires of this character is provided with a non-stretchable band embedded therein, to be readily withdrawn from the tire-seat or rim and quickly and easily restored within said rim, so as to firmly retain the tire in place when inflated.

The above object is attained by the structure illustrated in the accompanying drawings, in which—

Figure 1 is a transverse section through a tire embodying my invention, said section being taken through the removable retaining member forming a complementary part of the rim as on line 1 1 of Fig. 3. Fig. 2 is a similar section as on line 2 2 of Fig. 3. Fig. 3 is an elevation of a portion of a tire embodying my invention, showing the removable retaining-segment forming a complementary portion of the rim. Fig. 4 is a fragmentary view in perspective of a portion of the removable segment and rim united. Fig. 5 is a similar view showing said parts separated. Fig. 6 is an elevation of a portion of a tire and rim, showing the removable rim-segment composed of two parts united by a turnbuckle and showing the ends of said segment as connected with the body portion of the rim by means of laterally-projecting pins. Fig. 7 is a transverse section as on line 7 7 of Fig. 6. Fig. 8 is a fragmentary view in perspective, showing the manner of uniting the ends of the removable segment with the flange of the rim. Fig. 9 is a transverse section through a tire and rim, showing the application of the invention to a tire of the clencher pattern.

Referring to the characters of reference, 1 designates the felly of the wheel, to which is secured the metal portion 2 of the tire, which, for convenience we will term the "rim." The inflatable portion of the tire comprises an outer casing 3, of suitable material, and an inner tube 4, of rubber or analogous material. The outer casing is practically pear-shaped in cross-section, and in the margins thereof the metallic strands 5 are embedded, whereby said margins are rendered non-stretchable in a circumferential direction.

Upon one margin of the rim is formed an integral rolled flange 6, which is continuous for the entire circumference of the rim. Upon the opposite side of said rim is a similar flange 7, from which a portion is cut away for a distance equal to about one-fifth of the circumference of the rim. At the point where the rolled flange 7 is cut away the margin of the rim is turned upwardly, forming the short vertical flange 8, which stands slightly above the flat face of the rim. Each of the terminals of the rolled flange 7 is filled or rendered solid, as shown at 9, and formed therein is an undercut recess or socket 10.

To complete flange 7 of the rim at the point where said flange is cut away, a removable retaining-segment 11 is employed, having a rabbet 12 in the edge thereof, adapted to fit over the short flange 8, and having at each end a square projection 13, adapted to fit into the recess 10, the body of said segmental portion lying within the opening and completing the flange 7 between the terminals thereof. Projecting from the inner edge of the retaining-segment 11 is a thin tongue-like part 14, which extends onto the tire-seat or rim and lies under the inner tube and adjacent margin of the casing. Said segment completes the flange 7 and confines the margin of the casing within the rim at that point.

It will be observed that with the parts properly in place and the tire inflated the outward pressure exerted upon the casing will crowd the squared ends of the retaining-segment against the walls of the recesses in which they lie and the rabbeted portion of said segment against the short flange 8, thereby preventing any possible displacement of said retaining-segment and securely confining the margin of the casing, while the laterally-extending tongue 14, lying under the casing and inner tube, obviates any tendency of said segment to tip outwardly through the pressure of the casing against the inner edge thereof, said tongue being aided in preventing the tilting of said segmental portion by the square ends thereof, which lie in the correspondingly-shaped sockets in the terminals of the flange 7 of the rim. Longitudinal or circumferential movement of the segmental portion of the flange is prevented by the engagement of the ends 15 thereof with the terminals of the flange 7.

To remove the casing for the purpose of withdrawing the inner tube or for any other purpose, the tire is deflated, causing the outer casing to become flexible, enabling its margin to be sprung inwardly, so as to remove the pressure from the retaining-segment 11, when said segment may be moved to disengage its squared ends 13 from the recesses in the terminals of the flange 7, permitting said segment to be withdrawn from the rim, thereby removing a portion of the retaining-flange and enabling the margin of the casing to be readily stripped from the rim and the tire completely removed, if desired. To replace the tire, the casing is first seated in the rim, when the remaining segment 11 is slipped into place and the tire inflated, thereby automatically locking said segment in position.

Because of the fact that no longitudinal movement of the removable retaining-segment is permitted it cannot become accidentally disengaged from the rim through a deflation of the tire, as such disengagement can only be accomplished by sliding said segment inwardly against the margin of the casing until its square terminals can be free from the retaining-sockets in the ends of the flange 7.

It will be understood that when the parts are in place and the tire inflated the outer casing is firmly retained in the rim by the flange 6 upon one side and the flange 7 and retaining-segment 11 on the other, the non-stretchable quality of the strands 5 in the margins of the casing preventing the escape of the tire from the flange of the rim. It will also be understood that by means of the arrangement herein shown and described the removal of the tire from the rim and its replacement therein may be accomplished without the use of tools of any kind.

In the modified form shown in Figs. 6, 7, and 8 the retaining-segment 11 is provided in each of the square ends 13 thereof with an aperture 16, adapted to receive a pin 17, projecting from the recess 10 in the terminals of the flange 7, and instead of having a projecting tongue 14 said segment is divided at its longitudinal center and its divided ends connected by a turnbuckle 18, having a right and left thread, whereby said segment may be contracted to lock it in place after it has been seated in the rim, thereby securing it in place independently of the lateral pressure of the tire. Said segment may be readily removed by expanding it through the operation of said turnbuckle, so as to relieve the strain upon the pins 17, when it may be slid inwardly to free its ends from the sockets 10 and removed from the rim.

In Fig. 9 the outer casing instead of being provided with non-stretchable strands in its margins is provided with enlarged margins 19, having the laterally-projecting ribs 20, and the flanges of the rim are shaped to embrace said ribs, so as to form a tire of the clencher pattern, the segmental retaining member 11 of the flange being concavo-convex in cross-section to embrace the rib 20 of the casing conformatory with its registering flange.

Having thus fully set forth my invention, what I claim as new, and desire to secure by Letters Patent, is—

1. In a vehicle-tire, the combination with the casing having non-stretchable margins, a rim having flanges adapted to retain said margins, one of said flanges having a removable segment, said segment having an inwardly-extending tongue which lies under the margin of the casing, said segment and flange having interlocking terminal members.

2. In an inflatable vehicle-tire, the combination with the outer casing, of a rim in which said casing is seated, said rim having means for engaging the margins of said casing, said engaging means upon one side comprising a radial flange having a segment thereof made detachable therefrom to allow of the removal of the margin of the casing from the rim and means for extending said segment longitudinally to lock it in position on the rim.

3. In a vehicle-tire, the combination of the casing non-stretchable in its margins, a rim having engaging flanges adapted to confine the margins of said casing, one of said flanges having a removable segment to allow of the removal of the casing from the rim, said segment being extensible longitudinally and means for extending said segment longitudinally to lock it in place upon the rim to retain it securely in position.

4. In a vehicle-tire, the combination with the tire proper, of a rim having engaging flanges adapted to confine the tire therein, one of said flanges having a removable segment to allow of the removal of the tire, the terminals of said flange bordering on the opening filled by said segment, and having square sockets, and the terminals of said segment having square projections adapted to lie in said sockets to prevent the tilting of the segment when in position upon the rim.

5. In a vehicle-wheel tire, the combination with the tire proper, of a rim having flanges adapted to engage the tire, one of said flanges having a removable segment and means for expanding and contracting said removable segment.

In testimony whereof I sign this specification in the presence of two witnesses.

ANDREW T. SHERMAN.

Witnesses:
E. S. WHEELER,
I. G. HOWLETT.